G. A. STARKWEATHER.
SHOCK ABSORBER.
APPLICATION FILED AUG. 9, 1918. RENEWED NOV. 26, 1919.
1,339,484.
Patented May 11, 1920.
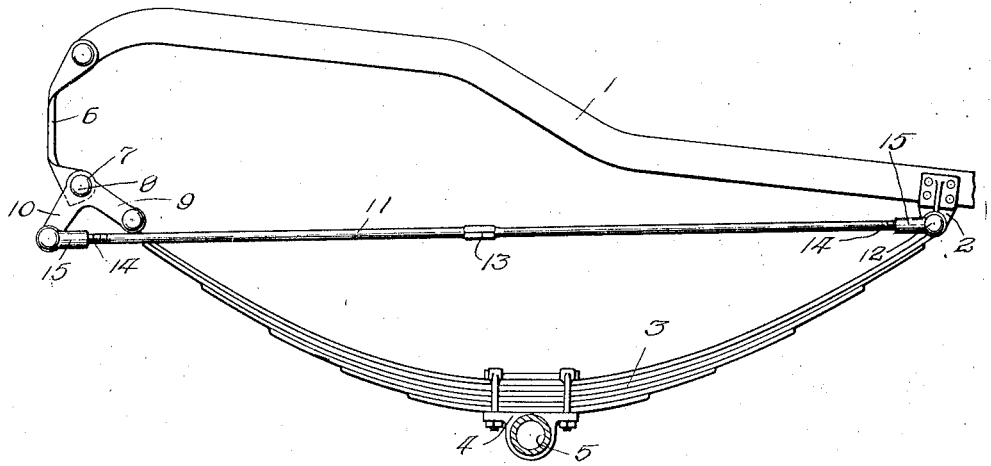
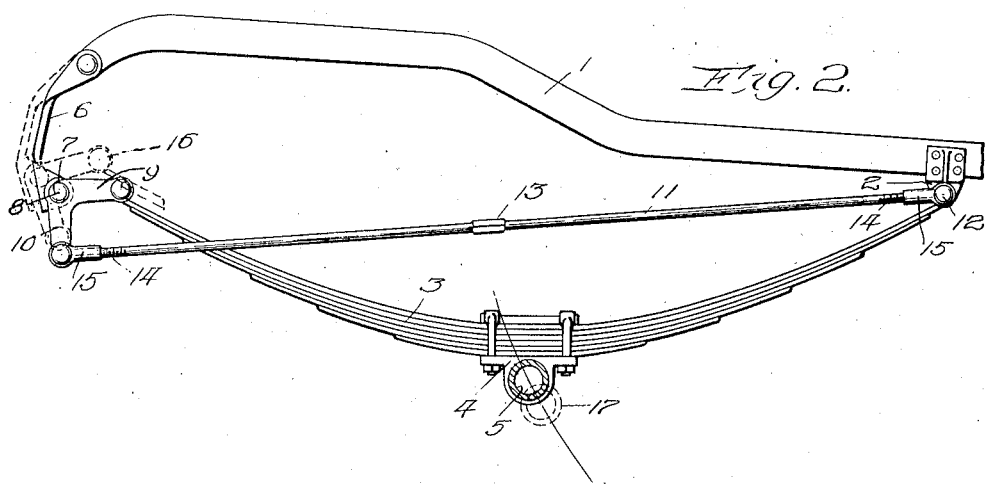
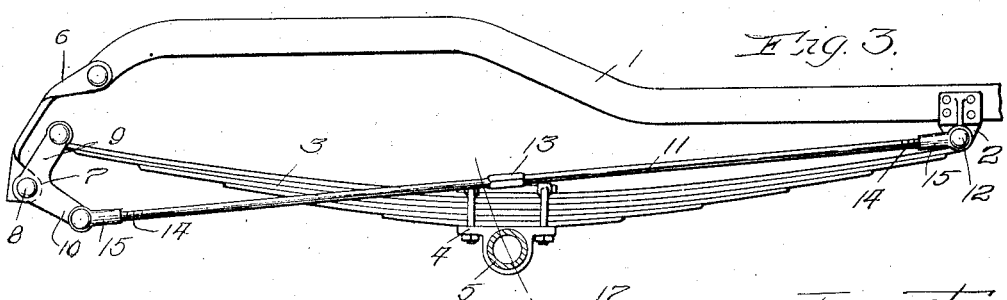

UNITED STATES PATENT OFFICE.

GEORGE A. STARKWEATHER, OF FORT MADISON, IOWA.

SHOCK-ABSORBER.

1,339,484. Specification of Letters Patent. Patented May 11, 1920.

Application filed August 9, 1918, Serial No. 249,064. Renewed November 26, 1919. Serial No. 340,802.

*To all whom it may concern:*

Be it known that I, GEORGE A. STARKWEATHER, a citizen of the United States, residing at Fort Madison, in the county of Lee and State of Iowa, have invented certain new and useful Improvements in Shock-Absorbers, of which the following is a specification.

This invention relates to a shock absorber for vehicles, particularly automobiles, but, of course, may have a more general application to other vehicles.

The principal object of the invention is to produce a construction in which the spring has a considerable range of movement without substantial compression or flexure under light load, to take up vibration in passing over obstructions and inequalities without communicating the jolt to the vehicle or its occupants, and to provide for adjusting the weight or load to the spring by varying the leverage as the load is applied.

Another object of the invention is to produce a construction which will ride upwardly and rearwardly when an obstruction is engaged by the wheel, thus causing a smooth yielding action without jolting.

The invention consists in the novel construction, combination and arrangement of the parts.

In the accompanying drawing—Figures 1, 2 and 3 are side elevations of a construction in accordance with the principles of this invention as applied to a semi-elliptical spring showing three different positions of the parts and illustrating different conditions to which the construction is subjected.

It is the common practice to connect either one or both ends of a spring to the vehicle frame by means of short links which allow the flexure or flattening out of the spring, but this, of course, confines the action of the spring itself to a comparatively short range of movement, and therefore even though a spring may be of considerable length so that it will give an easy yielding movement, the range of movement of the spring is not sufficient to prevent a sharp jolting action either when the vehicle wheel strikes an obstruction, or when there is a depression in the road over which the vehicle is traveling. Even in using many of the so-called shock absorbers it is found that although they will cushion a load for slight inequalities, they will not prevent a sharp jolting when the vehicle wheel rides into a rut, or when a sharp obstruction is encountered.

The present invention is designed and intended to provide for a considerable movement of one end of the spring without appreciable flexure of the spring itself, which means that even under a light load, one end of the spring will move smoothly for a considerable distance without communicating a jolt to the vehicle itself. This is better understood when an actual condition is considered; when an ordinary five or seven passenger automobile is filled to its rated capacity, it is found that the springs, particularly the rear ones, will act smoothly with little jolting or jarring as the vehicle passes over obstructions, depressions or inequalities in the road. But if the automobile is lightly loaded, as when there is a single person in the rear seat, it is found that the springs are too stiff for easy and comfortable riding as each inequality in the ground causes a sharp jolting action of the spring, and it is almost impossible for a passenger to remain seated on the back seat if the car is passing at all rapidly even over relatively small inequalities of ground. The present invention proposes to overcome these difficulties both for cars heavily and lightly loaded by providing a support for one end of the spring which will allow a considerable movement thereof, and also one which adjusts a heavier load to the spring by shortening the leverage of the connection as the weight is applied.

Referring now more particularly to the drawing, the reference numeral 1 designates generally a portion of a vehicle frame to which this invention is applied. At a distance from one end of the frame is a bracket 2 to which one end of an ordinary leaf spring 3 is pivotally connected, the other end of the spring extending to a point adjacent the end of the frame 1, and constituting what is known as a semi-elliptical spring. A clamping device 4 at the longitudinal center of the spring holds the leaves thereof together in a well-known manner and provides a support for a vehicle wheel axle 5.

Pivoted at the end of the frame 1 is a link 6, and connecting this link 6 to the other end of the spring 3 is a lever 7 in the form of a bell crank having its fulcrum 8 pivoted at the free end of the link 6 and having the extremity of one arm 9 pivoted to the end of the spring. The other end 10 of the bell crank is pivotally connected to one end of a bar 11, the other end of which has a fixed pivotal connection with a portion of the frame 1, preferably being connected to a bearing pin 12, which is coaxial with, or may be the same bearing pin upon which the far end of the spring 3 is connected to the frame. This bar 11 has a hexagonal portion 13 and threaded extremities 14 for adjusting the length of the bar with respect to terminals 15 thereof, and the bar is disposed at one side of the spring, preferably on the side thereof opposite the vehicle wheel where there are no obstruction which it will engage, and where the bar itself will be less noticeable.

It will thus be seen that the spring has a fixed pivot at one end and a bell crank at the other end which forms a variable pivot, the bell crank being swingingly mounted by means of the link 6, and the bell crank being guided as the spring moves up and down relatively to the frame by means of the guiding bar 11 which controls the variation of the bell crank, depending upon the load to which the spring is subjected, and thus varying the effective length of the spring, thereby saving and increasing its length of service, as well as its resiliency.

In operation, if it be assumed that the vehicle is loaded to produce an ordinary position of the spring and its connected parts, as shown in Fig. 2, it will be seen that the spring may be moved downwardly to the position shown in Fig. 1, or upwardly to the dotted position indicated by the numeral 16 without any substantial variation of the curvature or flexure of the spring itself. This means that the vehicle wheel may ride over a projection or drop into a depression of considerable size without producing any perceptible or appreciable compression of the spring, and without thereby causing any jolting or jarring action to be communicated to the frame of the vehicle. In other words, as the vehicle wheel rolls over slight inequalities of ground, the loose connection of the spring with the bell crank will take up the inequalities without communicating a jolting movement to the frame. Under these circumstances, the rod 11 will be subjected to a certain strain or pull, which, however, is not very great because of the angular disposition of the parts connecting the movable end of the spring to the frame, and it is found that a rod of small diameter is sufficient to withstand all strain placed upon it, the chief function of the rod being to maintain the bell crank in proper position at all times. As a greater load is placed upon the spring so that it becomes flexed, the pull on the rod becomes gradually less, so that when the spring assumes the position shown in Fig. 3, with the arm 9 of the bell crank in line with the fulcrum 8 and the pivot of the link 6 on the frame 1, there is no strain whatever upon the rod, and it may be removed or disconnected from the bell crank without in any way affecting the latter.

Under load, as for example when the bell crank assumes the position shown by the dotted outline in Fig. 2, it will be observed that there is still considerable space for the movement of the bell crank to enable it to assume various positions, and until the spring 3 is straightened out under load, as shown in Fig. 3. In the position, as shown by Fig. 2, it will be observed that the arm 9 of the bell crank forms a substantial continuation or lengthening, in effect, of the spring 3, thereby increasing the resiliency of the spring in action, but when the spring is subjected to a heavier load, as shown for example by Fig. 3, the straightening out of the spring causes the movable extremity thereof to approach the link 6, and under extreme loaded conditions, the end of the spring may abut the link 6, which will in effect shorten the length of the spring as the bearing point then is in contact with the link which forms a substantial continuation of the frame. In other words, as the load is applied to a spring having the connection described, the effective length of the spring is varied in accordance with the load, so that the length of the spring is decreased as the load is increased, thereby causing a stiffening action of the spring for accommodating the heavier load.

Another feature of this invention is that by having one end of the spring freely movable, as described, the spring will rock upwardly about its attached end, as shown particularly in Figs. 2 and 3, in which the dotted outline 17 represents the position occupied by the axle 5 before the spring is flexed or moved upwardly due to striking an obstruction. In this it will be observed that considering the outline 17 as stationary, the axle 5 rocks rearwardly and upwardly. The value of this will be appreciated if it be considered that the vehicle wheel strikes an obstruction, such for example as a rail which is immovable, and if the spring were not connected to rock upwardly and rearwardly, a direct sharp jolt would be communicated to the vehicle and to the occupants thereof, but by movably mounting the rear end of the spring, as shown and described, the contact of the vehicle wheel with such an obstruction will immediately cause the spring to be thrown upwardly into some such position, as indicated in Fig. 3, which it will be observed is upwardly and rearwardly, the end of the spring 3, which is connected to the bracket 2, being considered as the front end of the spring.

While this invention has been described as employed in connection with a semi-elliptical spring, it is obvious, of course, that the same construction may be employed with an elliptical or three-quarters elliptical spring. Furthermore, it would make no particular difference if the front end of the spring 3 were connected by means of a link to the frame 1, as this would simply increase the swinging action of the spring and would assist, rather than be a detriment to the construction described at the other end of the spring.

I claim:—

1. In a shock absorber, a vehicle frame and a spring connected at one end thereof to the frame, and a connection at the other end of the spring including a lever with one arm pivoted to the spring and with the extremity of the other arm pivotally connected to swing about the first-named end of the spring as a center.

2. In a shock absorber, a vehicle frame and a spring pivotally connected at one end thereof to the frame, and a connection at the other end of the spring including a bell crank with one arm connected to the spring and with the extremity of the other arm connected to swing upon an axis located at the first-named end of the spring.

3. In a shock absorber, a vehicle frame and a spring pivotally connected at one end thereof to the frame, and a connection between the spring and the frame at the other end including a lever having its fulcrum swingingly connected to the frame with one extremity of the lever pivotally connected to the adjacent end of the spring and the other end of the lever connected to swing about the far end of the spring as an axis.

4. In a shock absorber, a vehicle frame and a spring pivotally connected at one end thereof to the frame, a connection between the frame and the other end of the spring including a link pivoted at one end to the frame, a bell crank having its fulcrum pivoted to the other end of the link, one extremity of the bell crank being pivotally connected with the adjacent end of the spring and the other end of the bell crank being connected to swing about the far end of the spring as an axis.

5. In a vehicle shock absorber, a frame, a spring pivotally connected at its front end to the frame, and a link and lever connection at the rear end of the spring which swings about an axis at the front end of the spring and allows upward movement of the spring without material flexure thereof under light load so that the central portion of the spring will be deflected upwardly and rearwardly when an obstruction is engaged by a wheel carried by the spring.

6. In a shock absorber for vehicles, a spring pivotally connected to the vehicle frame at one end of the spring, and means including a link and a bell crank to connect the other end of the spring to the frame and to allow the spring to swing about the first-named end thereof as an axis without materially flexing it.

7. In a shock absorber, the combination with a vehicle frame, of a leaf spring pivotally connected to the frame at one end of the spring, a loose connection between the other end of the spring and the frame comprising a link and a lever, and means to guide the lever to swing in a path about the other end of the spring as an axis so that the central portion of the spring will swing upwardly and rearwardly in its flexing action under load.

8. In a shock absorber, a vehicle frame, a spring pivotally connected at one end thereof to the frame, a connection at the other end of the spring including a link pivoted at one end to the frame, a bell crank pivoted at its fulcrum to the other end of the link, one extremity of the bell crank being pivoted to the adjacent end of the spring, and a bar connected to the other extremity of the bell crank and pivoted to swing upon an axis at the far end of the spring.

9. In a shock absorber, the combination with a vehicle frame, of a curved leaf spring pivotally connected at one end thereof to the frame, means forming a connection between the other end of the spring and the frame including a link connected at one end to the frame, a bell crank pivoted at its fulcrum to the other end of the link and pivotally connected at one of its extremities to the adjacent end of the spring, and means confining the other end of the bell crank to an arcuate movement upon a radius substantially the length of the spring.

10. In a shock absorber, a vehicle frame and a curved leaf spring pivotally connected at one end thereof to the frame, means forming a connection between the frame and the other end of the spring including a link pivoted at one end to the frame and a bell crank pivoted at its fulcrum to the other end of the link, one arm of the bell crank being pivotally connected to the end of the spring and forming a substantial continuation thereof when the spring is under a light load, and means to cause the rotation of the bell crank as the load on the spring increases and to shorten the effective length of the spring as the load is applied.

11. In a shock absorber, a vehicle frame, a spring pivotally connected at one end thereof to the frame, a connection between the frame and the other end of the spring including a link pivoted to the frame and a bell crank pivoted at its fulcrum to the link, one end of the bell crank being connected to the adjacent end of the spring, and a guiding bar pivotally connected at one end to the other end of the bell crank and at the other end to a pivot at the far end of the spring, the bar having end terminal portions and oppositely threaded portions at the ends of the bar for varying the length of and tension on the bar by the rotation thereof in the said terminals.

In testimony whereof I have signed my name to this specification on this 27 day of July A. D. 1918.

GEORGE A. STARKWEATHER.